US006317049B1

(12) United States Patent
Toubia et al.

(10) Patent No.: US 6,317,049 B1
(45) Date of Patent: Nov. 13, 2001

(54) APPARATUS AND METHOD FOR LOCATING MISSING PERSONS, ANIMALS, AND OBJECTS

(76) Inventors: Souhail Toubia, 27001 Mission Hills Dr., San Juan Capistrano, CA (US) 92675; John S. Browning, 3804 Smith SE., Albuquerque, NM (US) 87108

( * ) Notice: Subject to any disclaimer, the term of this patent is extended or adjusted under 35 U.S.C. 154(b) by 0 days.

(21) Appl. No.: 09/227,624

(22) Filed: Jan. 8, 1999

Related U.S. Application Data
(60) Provisional application No. 60/074,910, filed on Feb. 17, 1998, and provisional application No. 60/091,274, filed on Jun. 30, 1998.

(51) Int. Cl.[7] .................................................... G08B 23/00
(52) U.S. Cl. .................. 340/573.4; 340/539; 340/825.36
(58) Field of Search ........................... 340/573.4, 825.36, 340/825.37, 825.49, 539, 10.1, 10.4, 10.42; 342/357, 347, 457, 453, 450; 701/213, 214, 215; 455/404, 521

(56) References Cited

U.S. PATENT DOCUMENTS

| | | |
|---|---|---|
| 3,172,108 | 3/1965 | McClure . |
| 4,086,916 | 5/1978 | Freeman et al. . |

(List continued on next page.)

OTHER PUBLICATIONS

Miller, Barry, Contributing. Editor, "Satellites Free the Mobile Phone", *IEEE Spectrum*, Mar. 1998, pp. 26–35.
Carne, E. Bryan, (1995), "Telecommunications Primer: Signals Building Blocks, and Networks", Feher/Prentice Hall, New Jersey, pp. 476–477.
Danchik, R. J., (1988), "Navy Navigation Satellite System Status", Rec. IEEE Position Location and Navigation Symp., pp. 21–24.

Dichmann, D. J., (Aug./Sep. 1997), "The Constellations in LEO", Launchspace Magazine, pp. 40–42.
Fu, T. L., (Aug. 1994), "Optimize the Performance of Pager Antennas", Microwaves & RF.
Keightley, R.J., (May 1987), "Simulation of the Canadian GOES Signal Processor", IEEE Trans. Aerosp. Electron. Syst., pp. 361–370.
Kouba, J., (Feb. 1983), "A Review of Geodetic and Geodynamic Satellite Doppler Positioning", Rev. Geophys. Space Phys. vol. 21, No. 1, pp. 27–40.
Kuboyama, H. et al., (Aug. 1985), "Post Loaded Microstrip Antenna for Pocket Size Equipment at UHF", Proc. ISAP, pp. 433–436.
Nordwall, B. D., (Dec. 5, 1994), "Small GPS Receivers Open New Possibilities", Aviation Week & Space Technology, pp. 57–58.

Primary Examiner—Jeffery Hofsass
Assistant Examiner—John Tweel, Jr.
(74) Attorney, Agent, or Firm—Knobbe, Martens, Olson & Bear, LLP

(57) ABSTRACT

A micropower transponder operates in conjunction with a constellation of low-to-medium Earth-orbiting communication satellites. The transponder is attached to a person, animal, or object. The location of a missing person, animal, or lost object is ascertained by locating the transponder associated with that person, animal, or object. The transponder may be hidden in the individual's hair, timepiece, jewelry, or article of clothing; may be swallowed by the individual; may be implanted under the individual's skin; or incorporated into an inconspicuous hand-held device such as a cellular telephone, pager, or calculator. The transponder includes a receiver for receiving an interrogation radio signal and a transmitter for transmitting a response radio signal. The transponder transmits the response radio signal in response to the interrogation radio signal if the interrogation radio signal includes a code matching the access code stored in the transponder. The Doppler shift in frequency of the response radio signal is measured and the Doppler shift is used to determine the location of the transponder.

22 Claims, 4 Drawing Sheets

U.S. PATENT DOCUMENTS

| | | |
|---|---|---|
| 4,406,290 | 9/1983 | Walbeoffe-Wilson et al. . |
| 4,598,272 | 7/1986 | Cox . |
| 4,764,757 | 8/1988 | DeMarco et al. . |
| 4,818,998 | 4/1989 | Apsell et al. .......................... 342/44 |
| 4,872,164 | 10/1989 | Rieger . |
| 4,891,650 | 1/1990 | Sheffer . |
| 4,908,629 | 3/1990 | Apsell et al. . |
| 4,918,425 | 4/1990 | Greenberg et al. . |
| 5,218,344 | 6/1993 | Ricketts . |
| 5,335,664 | 8/1994 | Nagashima . |
| 5,418,538 | 5/1995 | Lau . |
| 5,432,521 | 7/1995 | Siwiak et al. . |
| 5,444,450 | 8/1995 | Olds et al. . |
| 5,455,961 | 10/1995 | Nakagawa . |
| 5,488,640 | 1/1996 | Redden et al. . |
| 5,497,402 | 3/1996 | Pyo et al. . |
| 5,500,648 | 3/1996 | Maine et al. . |
| 5,568,119 | 10/1996 | Schipper et al. ..................... 340/539 |
| 5,592,175 | 1/1997 | Tayloe . |
| 5,610,615 | 3/1997 | Chiodini . |
| 5,613,193 | 3/1997 | Ishikawa et al. . |
| 5,629,678 | 5/1997 | Gargano et al. ..................... 340/539 |
| 5,652,570 | 7/1997 | Lepkofker ............................. 340/573 |
| 5,657,232 | 8/1997 | Ishikaka et al. . |
| 5,659,545 | 8/1997 | Sowles et al. . |
| 5,666,122 | 9/1997 | Carter . |
| 5,666,647 | 9/1997 | Maine . |
| 5,729,205 | 3/1998 | Kwon . |
| 5,729,558 | 3/1998 | Mobin . |
| 5,731,757 | 3/1998 | Layson, Jr. . |
| 5,742,233 * | 4/1998 | Hoffman et al. ...................... 340/573 |
| 5,742,908 | 4/1998 | Dent . |
| 5,760,692 * | 6/1998 | Block ................................... 340/573 |
| 5,771,001 | 6/1998 | Cobb . |
| 5,777,580 | 7/1998 | Janky et al. .......................... 342/457 |
| 5,781,155 | 7/1998 | Woo et al. . |
| 5,850,196 | 12/1998 | Mowers ................................ 342/357 |
| 5,884,216 | 3/1999 | Shah et al. ........................... 340/995 |
| 5,898,384 * | 4/1999 | Alt et al. ........................ 340/825.36 |
| 5,939,981 * | 8/1999 | Renney .......................... 340/825.36 |
| 5,959,529 * | 9/1999 | Kail, IV ......................... 340/825.36 |
| 5,982,281 * | 11/1999 | Layson, Jr. ..................... 340/825.36 |
| 6,072,396 * | 6/2000 | Gaukel ................................. 340/539 |

\* cited by examiner

APPARATUS AND METHOD FOR LOCATING MISSING PERSONS, ANIMALS, AND OBJECTS

REFERENCE TO RELATED APPLICATIONS

The present application claims the benefit of priority under 35 U.S.C. §119(e) of U.S. Provisional Application No. 60/074,910, filed Feb. 17, 1998, titled "APPARATUS AND METHOD FOR LOCATING MISSING PERSONS AND OBJECTS," and of U.S. provisional application No. 60/091,274, filed Jun. 30, 1998, titled "APPARATUS AND METHOD FOR LOCATING MISSING PERSONS AND OBJECTS."

BACKGROUND OF THE INVENTION

1. Field of the Invention

The present invention relates to location and monitoring systems, and more particularly, to systems using micropower transponders for locating and monitoring individuals, animals, or objects.

2. Description of the Related Art

A victim of abduction is usually unable to communicate his or her location or details of the abduction. For example, the victim may be restrained, or otherwise disabled. Often the victim will be gagged, and thus unable to speak. If the victim is able to escape and elude the captors, the victim may be confused and lack identification documents. Further, a kidnapped child may lack the verbal skills to provide sufficient information for rescue. A victim of abduction, who is unable to communicate or who is deprived of opportunities to obtain assistance, is especially vulnerable. Valuable animals or objects are also frequently lost or stolen and are difficult to locate.

In principle, individuals at high risk of abduction could carry a cellular telephone or a device that utilizes the global positioning system and a transmitter, or some other locating or direction finding system. Unfortunately, any conspicuous device carried by a victim can be easily removed and quickly disposed of by the captors. Further, the implementation of a terrestrial-based locating or direction finding system over the entire surface of the Earth requires the installation of a very expensive infrastructure. Coverage over very large geographic areas is not economical with terrestrial systems. In addition, global positioning receivers and other types of locating and direction finding systems have poor performance in built-up urban areas.

The long history of satellite Doppler tracking for position determination has proven that a constellation of low Earth-orbiting satellites can be used to track people, animals, or objects on the surface of the Earth. In 1957, the British developed satellite Doppler tracking to determine the orbit of the first artificial satellite. Broadcasts from Sputnik were monitored, and the Doppler shifts due to the relative motion of the satellite to ground-based receivers were measured. The changes in the Doppler shifts were then used to calculate the position vector between Sputnik and the ground receivers. In 1963, the U.S. Navy Transit system became operational. Broadcasts from Transit satellites were used to locate Navy ships equipped with Transit receivers to an accuracy of a few hundred meters. Multiple observations of Transit signals were later used for ground surveys to sub-meter accuracy. In recent years, satellite Doppler tracking has also been used in the international search and rescue satellite (SARSAT) system to locate distress signals from SARSAT beacons.

Technical advances in small satellite design and construction in recent years have created the opportunity to provide inexpensive satellite-based telephone and pager services to individuals. For example, Iridium Inc.'s planned constellation of 66 satellites is expected to begin voice messaging commercial service by the end of 1998 or early 1999. Satellites for systems that will compete with Iridium are also under construction by Loral and various industry consortiums.

Animal tracking tags using Ultra High Frequency (UHF) Transmitters provide long-range tracking through orbiting satellite receivers by using very low data rates. The low data rates allow the use of very narrow bandwidths to communicate the animal's identification and to determine the animal's position by measuring the Doppler shift of the transmitter's carrier. This technique was first demonstrated using the OSCAR 6 amateur radio satellite and has been used to locate Emergency Locator Transmitters (ELT) from downed aircraft and hikers. Unfortunately, narrow band systems can only service a limited number of tags.

Conventional medical monitoring devices that monitor patient vital signs generally operate only within institutional settings such as in a hospital, school, or prison facility. Therefore, these medical monitoring devices are not designed for wide-area or global service areas. Furthermore, the medical devices are not adapted for use in a global location and monitoring system.

Child monitoring devices that use two portable units, one for the child and one for the parent, are applicable only to very special situations and are intended to operate in a very limited geographical area. Ground-based location systems, such as LORAN C, LoJack, Teletrac, and the like, all have limited geographic coverage, usually confined to large metropolitan or coastal areas.

To summarize, existing systems do not provide for global location of missing persons, animals, or lost objects using an implantable or hidden transponder, for collecting, transmitting and analyzing data over predetermined periods of time. Furthermore, existing systems do not provide remotely accessible archives of data, as opposed to summary data, in which data is accumulated over a period of time.

SUMMARY OF THE INVENTION

The present invention solves these and other problems by providing a method of locating missing persons, animals, or lost objects without the geographic limitations of service areas of present systems. One embodiment includes a transponder for locating missing persons, animals, and lost objects using low-to-medium Earth-orbiting communications satellites. Persons, animals, or objects are equipped with a miniature, micropower transponder. Each transponder responds to a unique identifying access code. The transponder may be hidden in the individual's hair, timepiece, jewelry, or article of clothing; may be swallowed by the individual; may be implanted under the individual's skin; or incorporated into an inconspicuous hand-held device such as a cellular telephone, pager, or calculator. The transponder includes a receiver for receiving an interrogation radio signal and a transmitter for transmitting a response radio signal. The transponder transmits the response radio signal in response to the interrogation radio signal if the interrogation radio signal includes a code matching the access code stored in the transponder.

When a person, animal, or object is discovered to be missing, the access code corresponding to the transponder carried by the person (or attached to the object) is determined from a database. A transmitter located aboard an Earth-orbiting satellite, at a known location above the surface of the Earth, sends the interrogation radio signal including the access code. The Doppler shift in frequency of the response radio signal is measured. This Doppler measurement is combined with successive Doppler measurements to determine the location of the transponder on the surface of the Earth. The satellites in the Earth orbiting constellation then relay the location information to the monitoring station.

In one embodiment, the transponder includes small electromechanical sensors for gathering acceleration data, biometric data, and other types of data. Moreover, a transponder carried by an individual can receive information directly inputted by the individual. The monitoring station uses the satellite to broadcast alerts and interrogations directed to the transponder, and the transponder receives and replies the alerts and interrogations. In one embodiment, the transponder includes a vibratory enunciator to alert the individual of an inquiry signal from the monitoring station.

BRIEF DESCRIPTION OF THE FIGURES

The various novel features of the invention are illustrated in the figures listed below and described in the detailed description that follows.

Figure 1:
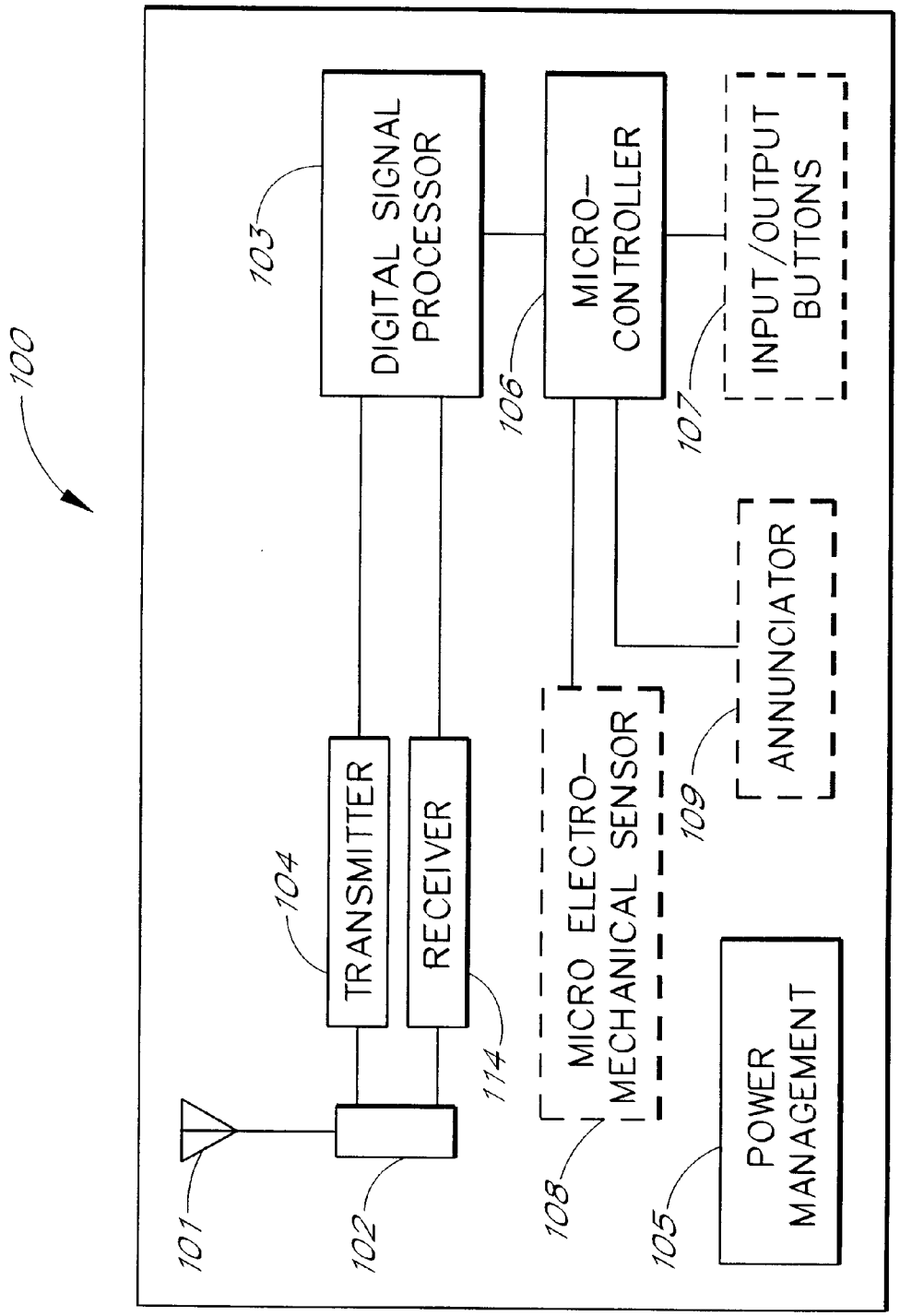
FIG. 1 is a block diagram of a location transponder.

In the drawings, the first digit of any three-digit number typically indicates the number of the figure in which the element first appears.

DETAILED DESCRIPTION OF THE PREFERRED EMBODIMENT

In one embodiment, the locator system uses radio transponders operating in conjunction with low to medium Earth-orbiting satellite constellations to locate missing individuals, objects, vehicles, and the like. The location of a missing individual or object is determined by using a miniature, micropower transponder worn by the individual or attached to the object. A monitoring station communicates with the satellites, and the satellites communicate with the transponder. Each part of the system has defined functions and communications protocols. In addition to location, the transponder may also provide information about a missing person's vital signs, including, for example, body temperature, pulse, respiration, blood pressure, etc.

The system allows a large number of transponders to be located by adopting multiple access techniques, such as, for example, Frequency Division Multiple Access (FDMA), Time Division Multiple Access (TDMA), or Code Division Multiple Access (CDMA), to create channels assigned to each transponder for communication to the satellite.

In one embodiment, the transponder uses microelectronic technologies to provide radio frequency and digital mixed signal processing functions, including output power amplifiers, efficient DC to radio-frequency up-conversions, and low noise amplifiers. The use of digital signal processing technology permits at least a portion of the communication functions to be performed in software, resulting in reductions in weight and cost as compared to analog communications systems designs.

Integrated circuit technologies permit the use of miniaturization and low power consumption in high packaging densities to provide miniature, micropower transponders. In one embodiment, flip-chip bonding, which attaches integrated circuit dies directly to a multichip module substrate, is used to reduce the number of bond wires and thereby increase the packaging density.

In one embodiment, the transponder uses a small antenna such as a post-loaded rectangular microstrip antenna for use on or near a human body. In one embodiment, the transponder uses a small loop antenna with ferrite loading.

The transponder is preferably capable of transmitting at power levels sufficient to communicate with a low Earth-orbiting satellite. The necessary transmit power for the transponder is, in many cases, less than the transmit power for a cellular telephone in a suburban area at 10 kilometers from a cellular tower. For example, the free space path loss to a satellite at 700 km (kilometers) altitude is typically about 157 dB for a 2.5 GHz frequency signal. The path loss for a typical 850 kHz cellular system is typically about 164 dB (the sum of a free space path loss of 114 dB; a reflection loss of 30 dB; and a multipath loss of 20 dB). Sufficiently high transmit powers may be achieved with voltage multipliers for the post-loaded rectangular microstrip antenna, or resonant circuits in the case of the loop antenna. Further, the transponder operates at a relatively low duty cycle, with infrequent transmissions of only a few milliseconds in length. The relatively low average power requirement allows the transponder to be powered by a single lithium ion cell.

The transponder functions as a satellite beacon to permit accurate geolocation using Low Earth-Orbit (LEO) or Medium Earth-Orbit (MEO) communications satellites. The satellite beacon can be used as a tag to track people, animals, or objects anywhere in the world at anytime. The transponder may also include a one-way or two-way messaging capability. Using current integrated circuit technology and advanced packaging technology, a transponder is small enough to be hidden in an individual's hair, timepiece, jewelry, or clothing; can be swallowed by the individual; can be implanted under the individual's skin; or can be incorporated into a hand-held device such as a cellular telephone, pager, or calculator.

FIG. 1 is a block diagram of a transponder 100 including an antenna subsystem 101, a digital signal processor 103, a transmitter 104, a receiver 114, a power management subsystem 105, a microcontroller 106, an optional input/output buttons 107, an optional annunciator 109, and an optional electromechanical sensor 108. The antenna 101 is coupled to the receiver 114 and to the transmitter 104 by a coupler 102.

For applications where the transponder 100 is implanted under the skin of a person or animal, the transponder 100 is housed in a non-reactive material (e.g. glass, silastic, hydroxylapatite, solid silicone elastomer, acrylic resins, ultra-high molecular weight polyethylene, poly(L-lactide) resins, copolymers and blends based on polylactide, etc.). In applications where the transponder 100 is swallowed, the transponder 100 is housed in a non-dissolvable material (e.g., ceramic materials based on alumina, ceramic materials based on yttriastabilized tetragonal zirconia (Y-TZP), ceramic materials based on hydroxyapatite, etc.).

Figure 2:
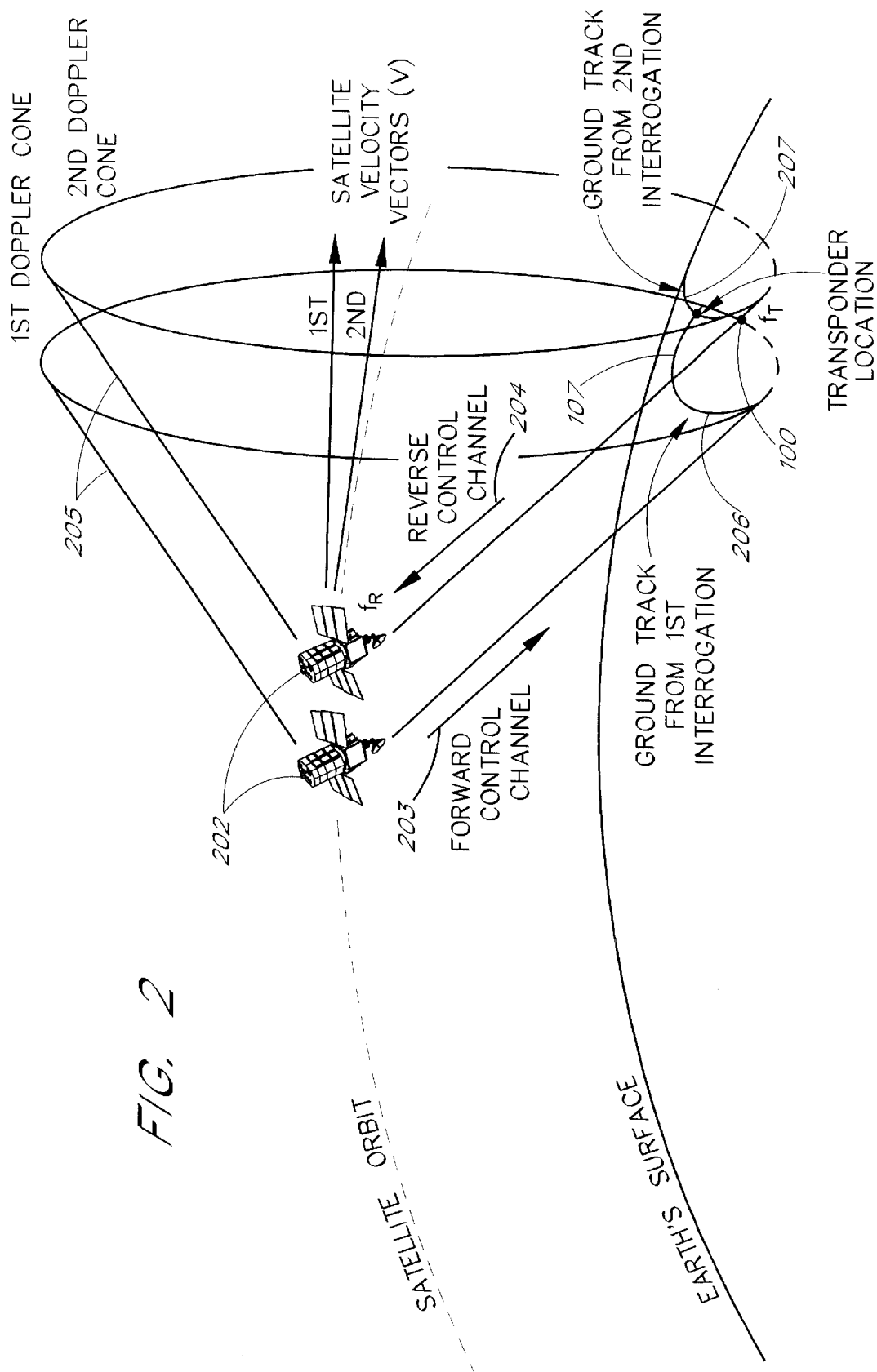
FIG. 2 illustrates the use of electromagnetic signals from a satellite to determine the location of a transponder.

FIG. 2 illustrates the use of the transponder 100 in connection with a satellite 202 to locate the transponder 100 on the surface of the Earth. The satellite 202 has an antenna, transmitter, and receiver used to send and receive signals between the satellite 202 and the surface of the Earth. The satellite 202 is desirably capable of measuring Doppler shifts of received signals for two reasons. First, the rapid movement of LEO satellites (e.g., 7.4 km/s for Iridium) may require frequent handoffs from one satellite to another. This handoff operation not only involves transferring the data and control signals from channels on one satellite to another, but also requires that the Doppler parameters be calculated prior to transitioning in order for the voice and control signals to be acquired without interruption. Second, the location of the transponder 100 may be used by a satellite communication system to make decisions regarding the granting or denying of communication services, billing rate, and the like.

The geolocation of the transponder 100 is determined by measuring the Doppler shift of signals that propagate between the satellite 202 and the transponder 100. The satellite 202 has a transmitter, which transmits a radio interrogation signal 203 that is received by the receiver 114 of the transponder 100. In response to the interrogation signal 203 the transponder 100 transmits a response signal 204 with carrier frequency $f_T$. The response signal 204 is received by the receiver in the satellite 202 with carrier frequency $f_R$. The difference $f_T-f_R$ is used to determine the Doppler shift of frequency of the received signal.

In order to receive the signal 204 with a given Doppler shift relative to the transmitted signal 203, the transponder 100 must have a location relative to the satellite 202 on a specified Doppler cone 205, as shown in FIG. 2. Each Doppler shift corresponds to a Doppler cone for that Doppler shift. Since the transponder 100 is assumed to be located on the surface of the Earth, the intersection of the Doppler cone 205 with the Earth's surface results in a ground track 206 of possible transponder locations. A second Doppler measurement is obtained by re-transmitting the interrogation signal 203 and obtaining a second Doppler measurement from the response signal 204. The second Doppler shift measurement results in a second ground track 207. The intersection of the ground tracks 206, 207 provides a two-position location solution for the transponder 100. The two-position solution includes an actual position and an image position. The actual position may be detected by identifying a cell within which the communication took place, or by detecting the Doppler shift due to the eastward rotation of the Earth. Subsequent Doppler shift measurements produce additional candidate locations, which are used to seed a least-squares estimation to calculate the transponder location to a desired accuracy.

Figure 3:
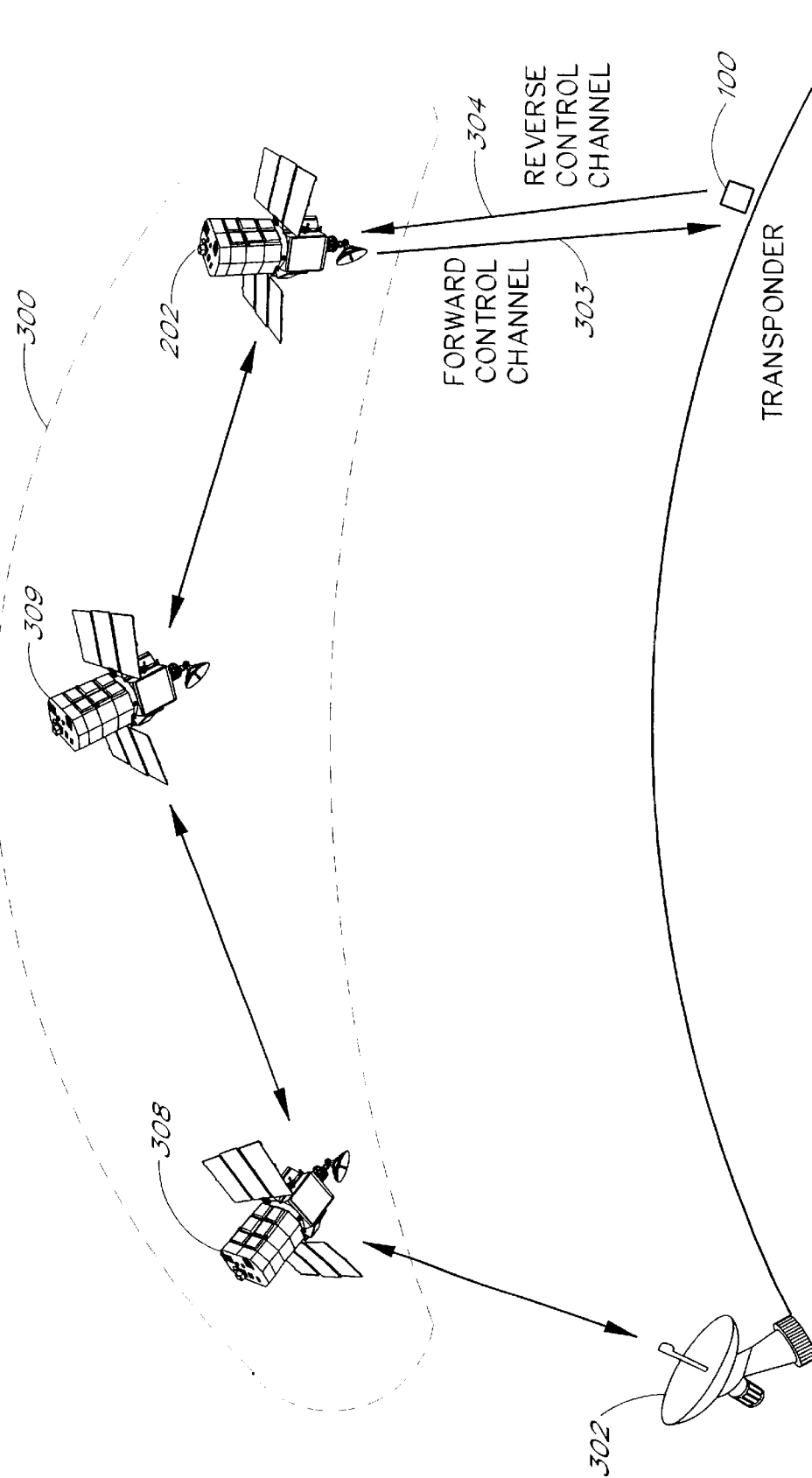
FIG. 3 illustrates a satellite system, using multiple satellites, to provide communication between a transponder and a ground station.

FIG. 3 is a block diagram showing the coordinated operation of the transponder 100 with a satellite and ground station system. When an individual equipped with a transponder 100 is discovered to be missing, the unique access code corresponding to the transponder 100 carried by that individual is determined. This information is forwarded by a ground station 302 to an orbiting communications satellite in a satellite constellation 300. For example, the satellite 202, illustrated in FIG. 2, is preferably one of the satellites in the constellation 300. The satellites in the constellation 300 attempt to communicate with the transponder 100. The transmitters aboard the satellites 300 transmit a radio signal that includes the access code for the transponder 100. Only the transponder 100 with the code included in the interrogation signal will respond to the interrogation signal.

The transponder 100 has three primary modes of operation: a relatively low power "sleep" mode, a medium power receive mode, and a relatively high power transmit mode. Periodically, the transponder 100 switches from the sleep mode to the receive mode and automatically scans a group of forward control channels to find the channel with the strongest signal. The transponder 100 monitors the selected control channel until the signal drops below a usable level, at which point the transponder again scans the group of forward control channels in search of a usable signal. When the ground station 302 instructs the satellite constellation 300 to locate a transponder 100, the request is relayed to all satellites in the constellation 300. The transponder access code is then broadcast as a paging message over all of the forward control channels 303 throughout the satellite constellation 300. The transponder 100 receives the paging message sent by the overhead satellite 202. The transponder 100 responds by switching to the transmit mode and sending a response message over the reverse control channel 304. The satellite 202 relays the response sent by the transponder 100 and informs the ground station 302 of the communication with the transponder 100 and the measured Doppler shift of the transponder's carrier frequency. At this point, the overhead satellite 202 instructs the transponder 100 to identify itself again, and the second Doppler shift measurement of the transponder's reply is relayed to the ground station. The process may be repeated as required to obtain a sufficiently accurate estimate of the location of the transponder 100.

When the transponder 100 initiates communication, a request to be located is sent on the reverse control channel 304. In this request, the transponder 100 transmits an identification number, status, and identifies the destination for the information. The overhead satellite 202 receives this data and relays it to the appropriate ground station 302. The ground station 302 validates the request, and instructs the overhead satellite 202 to locate the transponder 100 by contacting the transponder 100 again.

In an alternate embodiment, interrogation signals directed to the transponder 100 are sent sequentially from the satellite constellation 300 beginning with the satellite 202 orbiting over the portion of the Earth's surface corresponding to the last known location of the transponder 100. In one embodiment, the Doppler shift measurements are forwarded from the satellite 202 to the ground station 302. The ground station 302 performs the calculation of the location estimate. In an alternate embodiment, the satellite 202 calculates the location estimate and transmits the location estimate to the ground station 302.

An additional benefit of the system is the covert nature of the location method. In one embodiment, the transponder 100 is not active, (i.e., does not transmit), unless it is interrogated and the radio interrogation signal contains the transponder's identifying access code. Further, the transponder does not broadcast its position. Finally, the radio response signal is difficult to intercept as the transmission lasts only a short period of time (typically a few tens of milliseconds or less).

As noted above, it is desirable to provide a mode of operation in which the nature of an emergency is communicated, without requiring oral communication from the victim. In one embodiment, this feature is provided by providing a plurality of buttons on the transponder 100. Each button corresponds to a different type of emergency, e.g., hostage, lost, medical, etc. By pressing the corresponding button, a status code is added to the response signal sent by the transponder 100. The status code is relayed by the satellite 202 to the ground station 302. Alternatively, the status code may be used to directly initiate an emergency call to the appropriate authority in the geographic area in which the transponder 100 has been located. This latter mode has the advantage of avoiding centralized processing centers, and hence, provides a system that is less prone to catastrophic failure.

With the exception of the software functions related to providing the transponder access code in a transmitted signal, and the geolocation calculation based upon Doppler shift measurements, the location system operates independently of the equipment carried aboard the Earth-orbiting communications satellites. Thus, existing or planned satellite equipment does not have to be replaced or modified to provide the advantages of the present invention. The transponder 100 may be incorporated into a variety of hand-held wireless devices, thereby allowing the transponder 100 to share electronic circuitry such as antennae, transmitter, receiver, and microcontroller.

The transmitter and receiver used to communicate with the transponder 100 may also be terrestrial-based and independent of the transmitter and receiver carried aboard the satellites.

The transponder 100 requires a source of power. Power can be provided by a dedicated battery that is periodically recharged or replaced. The transponder 100 does not require a large amount of power especially in the sleep and receive modes. Relatively more power is needed during the brief times when the transponder 100 is operating in transmit mode. Hence, the average power that must be provided by a battery is relatively small.

In one embodiment, the transponder 100 is included in a replacement battery pack for a hand-held device. In this embodiment, the problems associated with replacing or recharging batteries are avoided, since the transponder operates off the same battery as the hand-held device.

While the above-described embodiments of the present invention have used antennas carried by Earth orbiting satellites, it will be apparent to those skilled in the art that a mobile antenna system may also be used in conjunction with a transponder according to the present invention. A mobile antenna used on a responding emergency vehicle allows a response team to "home-in" on the transponder location. The time delay between the transmission of the interrogation signal and the receipt of the response signal from the transponder 100 can be used to estimate the distance from the mobile antenna to the transponder.

The distance and direction from the mobile antenna may also be used to provide location information. In this case, the mobile antenna includes an array of sub-antennas that are used to determine the direction of the incoming signal from the phase delay observed in the signals received by the various sub-antenna which are physically separated from one another. Alternatively, if the carrier frequency for the interrogation signal is at a sufficiently high frequency, the direction to the transponder 100 may be determined by using a directionally limited interrogation signal. In this embodiment, the interrogation signal is sent in a particular direction and the system waits for a response from the transponder 100. If no response is received, the direction is incremented and the process repeated until a response is received. If a response is received, the direction to the transponder 100 corresponds to the direction in which the interrogation signal was sent. The time delay between the interrogation signal and the response is used to determine the distance to the transponder.

Figure 4:
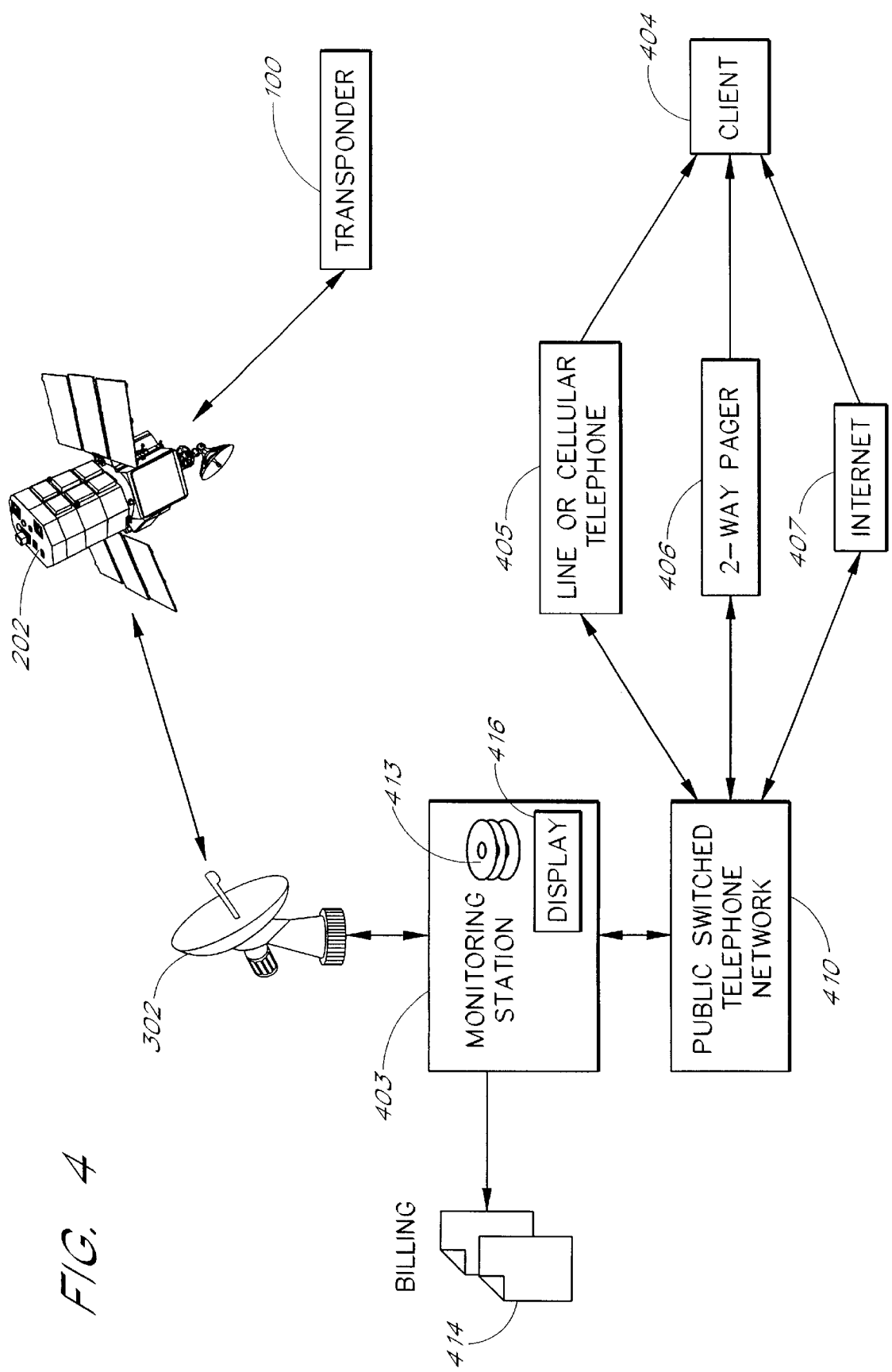
FIG. 4 is a block diagram of a system for locating a missing person, animal, or object using a satellite transponder.

FIG. 4 is a block diagram of a location and monitoring system 400, including the transponder 100 and the satellite constellation 300. The satellite constellation 300 communicates with a ground station 302. The ground station 302 communicates with a monitoring station 403. The monitoring station 403 coordinates monitoring and location of the transponder 100 for a client 404. The monitoring station 403 includes a database 413 that contains information regarding the transponder 100, such as, for example, a serial number of the transponder 100, the access code for the transponder 100, a last known location of the transponder 100, billing information for charges relating to the transponder 100, the name of the client 404 and other parties that are allowed to request information about the transponder 100, the name of the person carrying the transponder 100, etc. The monitoring station also includes an optional display 416 configured to show a map of at least a portion of the earth and the position of the transponder 100 on the displayed map.

The monitoring station 403 is connected to a public switched telephone network, thus allowing the client 404 to communicate with the monitoring station using a telephone 405 (conventional, cellular, or satellite), a pager 406, the internet 407, and the like.

To prevent tampering, communication between the monitoring station 403 and the client 404 may be encrypted. As shown in FIG. 4, the monitoring station 403 uses a satellite ground station 302 to communicate with the Earth-orbiting satellite constellation 300. The satellites are used to relay interrogations from the monitoring station 403 to the transponder 100.

The transponder 100, the satellite constellation 300, and the monitoring station 403 operate together as a system 400 to provide for monitoring and locating persons and objects. Several levels of monitoring are contemplated.

In a first monitoring level, the position of the transponder is determined on an event basis. In the event-based mode, there is little, if any, routine communication between the transponder 100 and the satellite constellation 300. Under routine conditions, (i.e., when the person, animal, or object associated with the transponder 100 is not lost and does not need to be monitored) the satellite constellation 300 typically does not send signals to the transponder 100 under control of the power management subsystem 105 (shown in FIG. 1). The transponder 100 periodically awakens from the low-power sleep mode to the medium power receive mode. In the receive mode, the transponder 100 listens for a communication from the satellite constellation 300. If no communication is received, then the power management system 105 causes the transponder 100 to go back into the low-power sleep mode.

When a client 404, such as a relative of the person carrying the transponder 100, becomes aware that a kidnapping, or some other event has occurred, the client 404 contacts the monitoring station 403. The client 404 provides the name of the person carrying the transponder 100, or alternatively, the serial number of the transponder 100 to the monitoring station 403. In one embodiment, the client 404 also provides a password or other security code to the monitoring station 403. The client 404 may also provide a phone number, police file number, or other instructions to the monitoring station 403 so that the monitoring station 403 will know how to contact the client 404 when the transponder 100 is located. Using information supplied by the client 404, the monitoring station 403 determines, from its database 413, the access code for the transponder 100. The monitoring station 403 then instructs the satellite constellation 300 to begin transmitting communication messages to the transponder 100, using the access code for the transponder 100.

When the transponder 100 wakes up, either through its normal wake-up process or because it has been manually activated, the transponder 100 receives the communication from one of the satellites 300 and provides a response, thereby allowing the transponder to be located 100. Once the transponder 100 is located, the location is provided to the client 404. The cost associated with locating the transponder 100 may be billed on a flat monthly basis or a fee may be charged each for each request to locate the transponder 100.

Thus, the event-based monitoring level is characterized, in part, by low cost and low transponder power requirements. Power requirements in the transponder 100 are low because, under normal conditions, the transponder is in the sleep mode, and the transponder is typically not using the high-power transmit mode. Cost is low because the satellite system 300 is not used under routine conditions. The satellite system 300 is used for locating the transponder 100 on an as-needed basis.

A second monitoring level provides active monitoring of the transponder 100. The active monitoring level, provides routine monitoring of the transponder 100 by using regular communication between the transponder 100 and the satellite constellation 300. On a regular basis, the satellite constellation 300 sends signals to the transponder 100. The transponder 100 periodically awakens from the low-power sleep mode to the medium power receive mode. In the receive mode, the transponder 100 listens for the communication signals from the satellite constellation 300. When a communication signal is received, the transponder 100 goes to the high-power transmit mode and transmits a response to the satellite constellation 300. The response is used by the system 400 to locate the transponder 100.

The response sent by the transponder 100 may also provide information such as vital signs (pulse rate, blood pressure, etc.). If the transponder 100 is attached to an object, such as a vehicle, the transponder 100 may provide information such as speed, fuel consumption, temperature, etc. The location of the transponder 100 and any information provided by the transponder 100 are saved in the database 413.

The client 404 can contact the monitoring station 403 and obtain from the database 413 current or past information about the transponder 110. The client 404 provides the name of the person carrying the transponder 100, or alternatively, the serial number of the transponder 100. In one embodiment, the client 404 also provides a password or other security code to the monitoring station 403. After verifying the client 404, the monitoring station 403 provides information from the database 413 to the client 404. In one embodiment, the monitoring station 403 contacts the client 404 automatically when the transponder has been moved outside a prescribed area (such as when a vehicle that has been stolen or a person has traveled outside of a designated area).

The second monitoring level provides routine monitoring of the transponder 100. Power requirements for the transponder 100 in the second level are higher than in the first monitoring level because, under normal conditions, the transponder is routinely operating in the high-power transmit mode. Cost is higher under the second monitoring level because the satellite system is used on a routine basis.

The second monitoring level is useful for people that need routine monitoring such as, for example, people who are particularly susceptible to kidnapping, elderly people, parolees, people with a medical condition that warrants monitoring, children, etc. The second monitoring level is also useful for objects that need routine monitoring such as, for example, vehicles, cars, trucks, aircraft, boats, construction equipment, etc.

Various modifications to the present invention will become apparent to those skilled in the art from the foregoing description and accompanying drawings. Accordingly, the present invention is to be limited only by the scope of the following claims.

What is claimed is:

1. A method for locating a missing person, animal, or object, said method comprising the steps of:
    (a) providing a transponder having an access code that identifies said transponder, said transponder configured to receive an interrogation radio signal and transmit a response radio signal, said transponder transmitting said response radio signal in response to receiving said interrogation radio signal if said interrogation radio signal includes a code matching said access code;
    (b) determining said access code corresponding to said transponder;
    (c) transmitting said interrogation radio signal including said access code from a transmitter located aboard an Earth-orbiting satellite;
    (d) receiving said response radio signal;
    (e) measuring a Doppler shift in frequency of said response radio signal; and
    (f) calculating a position of said transponder based on said Doppler shift.

2. The method of claim 1, further comprising the step of repeating steps (c) through (f) to determine the rate of change of said Doppler shift in frequency in said response radio signal.

3. The method of claim 2, further comprising the step of repeating steps (c) through (f) from satellites in a low to medium Earth orbiting constellation.

4. The method of claim 1, wherein said interrogation radio signal is limited to a known position above the surface of the Earth.

5. The method of claim 1, wherein said response radio signal includes a status code.

6. The method of claim 1, wherein further comprising the steps of sending an access code to said satellite and receiving said position from said satellite.

7. A transponder adapted for connection to a hand-held device, said transponder comprising:
    means for storing an identification access code;
    means for receiving an interrogation radio signal; and
    means for transmitting a response radio signal to an Earth-orbiting satellite, said transponder transmitting said response radio signal in response to receiving said interrogation radio signal if said radio signal includes a code matching said access code.

8. The transponder of claim 7, further comprising means for connecting said transponder to a battery to power said hand-held device.

9. The transponder of claim 7, wherein said transponder is integral to said battery.

10. The transponder of claim 6, further comprising means for inputting a status code specifying the nature of an emergency and means for incorporating said status code into said response radio signal.

11. A monitoring station comprising:
    a database for storing data regarding a plurality of transponders; and
    a first communication system configured to communicate with one or more Earth-orbiting satellites, said satellites configured to send interrogation signals to a transponder, said transponder configured to receive and reply to said interrogation signals;

a second communication system, said communication system configured to provide a client with data regarding a location of said transponder; and a data processing system, said data processing system configured to:
   determine said location of said transponder on an event basis;
   determine said location of said transponder on a monitored basis; and
   respond to status information embedded in said response signal.

12. The monitoring station of claim 11, wherein said interrogation signals and said response signals are encrypted.

13. The monitoring station of claim 12, further comprising a display for displaying said location of said transponder.

14. The monitoring station of claim 11, wherein said data processing system is further configured to produce billing information.

15. The monitoring station of claim 11, wherein said status information signal comprises biometric data about an individual, said data processing system further configured to identify anomalies in said biometric data.

16. The monitoring station of claim 11, wherein said monitoring station further includes a data archival storage system for storing information from said transponder.

17. The monitoring station of claim 16, wherein said archival data storage system instructs said second communication system to send a message to said client upon the occurrence of a predetermined selective event as determined by said client.

18. The monitoring station of claim 11, wherein said monitoring station comprises a display configured to show data from said transponder, said display configured to show alphanumeric characters and graphical maps.

19. The monitoring station of claim 18 wherein said display comprises a multi-color, graphical map display showing a global view of movement of said transponder over an extended period of time.

20. The monitoring station of claim 11, wherein said data processing system is further configured to generate a warning announcement when said transponder is outside a prescribed area.

21. A method of remotely and interactively communication with an monitoring the location of a transponder comprising the steps of:
   establishing a monitoring station for maintaining location, and other data with respect to said transponder; and
   transmitting location and condition information from said transponder to said monitoring station by inputting information to a transponder worn by said individual, transmitting said information by said transponder to a satellite, and relaying said information by said satellite to said monitoring station;
   broadcasting interrogations by said monitoring station for receipt and relay by said satellite to said transponder, said transponder alerting said individual to the receipt of said interrogations;
   providing at least one microcontroller in said transponder which supports a continuous monitoring of interrogations, alarm conditions, and data from a micro electromechanical sensor; and
   providing at least one microprocessor in said transponder which supports accumulating said data for transmission and sending said data as a single compressed data packet to said monitoring station.

22. A system for locating and monitoring an individual comprising:
   a monitoring station for maintaining location information and other data regarding said individual; and
   a transponder worn by said individual in a manner for conveniently receiving medical and other information inputted directly from said individual, said transponder configured to communicate with a satellite for transmitting said information to said monitoring station, said satellite configured to collect data used to determine the location of said transponder, said transponder including vibratory annunciator means for alerting said individual to receipt of a signal from said monitoring station, said transponder worn by said individual in a manner to permit convenient access to input and receive information, said transponder further comprising buttons for initiating transmittal of emergency conditions representing different types of emergencies including "lost", "medical", and "abducted", said transponder further comprising a pressure sensitive actuator for initiating an alarm signal to be sent to said monitoring station, said transponder further comprising one or more biometric sensors for obtaining biometric data from said individual, said transponder configured to initiate the transmission of an emergency condition in the event that an anomaly is detected in said biometric data.

* * * * *

UNITED STATES PATENT AND TRADEMARK OFFICE
CERTIFICATE OF CORRECTION

PATENT NO. : 6,317,049 B1
DATED : November 13, 2001
INVENTOR(S) : Souhail Toubia et al.

It is certified that error appears in the above-identified patent and that said Letters Patent is hereby corrected as shown below:

<u>Column 11,</u>
Lines 44-45, please change "communication with an" to -- communicating with and --.

Signed and Sealed this

Twentieth Day of August, 2002

Attest:

Attesting Officer

JAMES E. ROGAN
*Director of the United States Patent and Trademark Office*